United States Patent Office

2,871,218
Patented Jan. 27, 1959

2,871,218

SIMULATED VULCANIZATES OF POLY-URETHANE ELASTOMERS

Charles S. Schollenberger, Cuyahoga Falls, Ohio, assignor to The B. F. Goodrich Company, New York, N. Y., a corporation of New York No Drawing. Application December 1, 1955
Serial No. 550,498

14 Claims. (Cl. 260—45.4)

This invention relates to simulated vulcanizates of polyurethane elastomers and relates more particularly to polyesterurethane elastomers which are substantially free of cross-links but which have the appearance and properties of cross-linked polyurethane vulcanizates, and to the method for making the same.

Diisocyanate-linked elastomers obtained by reaction of polyesters, polyesteramides, polyalkylene ether glycols and the like with organic diisocyanates are known. Optimum physical properties of these diisocyanate-linked elastomers are obtained by a cross-linking or vulcanization process. This cross-linking reaction is ordinarily performed by adding additional organic diisocyanate to the reaction product of essentially a polyester, polyesteramide or polyalkylene ether glycol and an organic diisocyanate, and subsequently heating to obtain a cross-linked vulcanizate; or by reacting larger excesses of organic diisocyanate with a polyester and the like and then adding a cross-linking agent such as water, a glycol or an aminoalcohol to cross-link the diisocyanate containing polyurethane.

It is desirable to have available to the art diisocyanate-linked elastomers which are free of cross-links, which have the optimum physical properties of cross-linked diisocyanate-linked vulcanizates without the necessity of going through an additional vulcanizing or cross-linking step, and which elastomers do not have the processing disadvantage of cross-linked vulcanizates. Such materials would be processable in the factory in the usual processing equipment such as calenders and extruders, and could be otherwise readily formed, which is not true of vulcanized polyurethanes which are not readily processable. These cross-link free materials also could be dissolved in solvents for cement applications which cannot be done with vulcanized diisocyanate-linked elastomers. Hard diisocyanate-linked elastomer coatings from cements now are obtained through a vulcanizing reaction by exposing a proper composition containing excess diisocyanate to water since the vulcanized materials are not soluble in solvents because of the cross-links. This process which is slow, cumbersome and difficult to control could be avoided by use of solutions of cross-link free elastomers since one could obtain tough films directly from solution on drying with no further treatment required.

I have now discovered elastomeric polyurethane materials having certain desirable physical properties as good or better than the known vulcanized or cross-linked polyurethanes and which are substantially free of cross-links. These elastomers are essentially linear; have tensile strengths of about 6000 or greater pounds per square inch, elongations of about 500 to 650%, and 300% moduli of about 1000 to 1600; have an abrasion resistance so good that in a Taber abrasion apparatus the weight loss is immeasurable; and have excellent resistance to hydrocarbons, air diffusion and aging. They are readily soluble not only in such solvents as dimethyl formamide but quite unexpectedly are also soluble in such solvents as cyclohexanone, tetrahydrofurane and dioxane. These materials are readily molded, and melt when heated to high temperatures.

The novel elastomers of this invention are derived from specific reactants in critical ratios. The elastomers are prepared by reacting 1.0 mol of a hereinafter defined polyester having a molecular weight greater than 600 and less than 1200 with about 1.1 to 3.1 mols of a diphenyl diisocyanate in the presence of about 0.1 to 2.1 mols of a free glycol containing from 4 to 10 carbon atoms. The ratio of free glycol to diphenyl diisocyanate is very critical and the recipe employed must be balanced so that there is essentially no free unreacted diisocyanate or glycol remaining after the reaction to form the elastomer of this invention. The amount of glycol employed will depend upon the molecular weight of the polyester in a manner set forth in detail hereinbelow. After heating the mixture of reactants to form the elastomer, no further treatment is required to develop the outstanding physical properties of the elastomers of this invention.

The polyester preferred for use in this invention is an essentially linear hydroxyl terminated polyester having a molecular weight between 600 and 1200 and an acid number less than 10, preferably the polyester has a molecular weight of from about 700 to 1100 and an acid number less than 5. More preferably the polyester has a molecular weight of 800 to 1050 and an acid number less than about 3 in order to obtain a product of optimum physical properties. The molecular weight is determined by assay of the terminal functional groups and is an average molecular weight. The polyester is prepared ordinarily by an esterification reaction of an aliphatic dibasic acid or an anhydride thereof with a glycol. Molar ratios of more than 1 mol of glycol to acid are preferred so as to obtain linear chains containing a preponderance of terminal hydroxyl groups.

The basic polyesters utilized include polyesters prepared from the esterification of such dicarboxylic acids as adipic, succinic, pimelic, suberic, azelaic, sebacic and the like or their anhydrides. Preferred acids are those dicarboxylic acids of the formula HOOC—R—COOH, where R is an alkylene radical containing 2 to 8 carbon atoms. More preferred are those represented by the formula HOOC(CH$_2$)$_x$COOH, where $x$ is a number from 2 to 8. Adipic acid is preferred.

The glycols utilized in the preparation of the polyester by reaction with the aliphatic dicarboxylic acid are preferably straight chain glycols containing between 4 and 10 carbon atoms such as butanediol-1,4, hexamethylenediol-1,6, octamethylenediol-1,8 and the like. In general the glycol is preferably of the formula HO(CH$_2$)$_x$OH, wherein $x$ is 4 to 8 and the preferred glycol is butanediol-1,4.

In the practice of the invention, and a critical feature thereof, a free glycol in an amount from about 0.1 to 2.1 mols is present in the polyester prior to reaction with the diphenyl diisocyanate. The free glycol preferably is mixed with the polyester prior to reaction with the diphenyl diisocyanate. Advantage may be taken of residual free glycol in the polyester if the amount is determined by careful analysis. As has been pointed out above, the ratio of free glycol and diphenyl diisocyanate is critical and must be balanced within the limits described hereinafter so that the end reaction product is substantially free of excess isocyanate or hydroxyl groups. The glycol preferred for this purpose is butanediol-1,4. Other glycols which may be employed include the glycols listed above.

The specific diisocyanates employed to react with the mixture of polyester and free glycol are also critical and necessary in order to obtain the outstanding diisocyanate-linked elastomers of this invention. A diphenyl diisocyanate such as diphenyl methane diisocyanate, diphenyl methane-p,p'-diisocyanate, dichlorodiphenyl methane diisocyanate, dimethyl diphenyl methane diisocyanate, diphenyl dimethyl methane diisocyanate, bibenzyl diisocyanate, diphenyl ether diisocyanate and the like are essential. Preferred are the diphenyl methane diisocyanates and best results are obtained from diphenyl methane-p,p'-diisocyanate. When other organic diisocyanates than the diphenyl diisocyanates described above are employed, the novel product of this invention is not obtained.

The amount of reactants employed may be varied from about 1.1 to 3.1 mols of diphenyl diisocyanate per mol of polyester, which polyester contains from about 0.1 to 2.1 mols of glycol, the amount of glycol depending upon the molecular weight of the polyester employed. The amount of diphenyl diisocyanate used is in turn dependent upon the amount of free glycol and polyester and should be an amount equivalent to these latter two reactants so that there are essentially no free unreacted isocyanate and hydroxyl groups remaining in the reaction product. A convenient method for determining how much glycol to add to the polyester prior to reaction of the mixture of polyester and glycol with the diphenyl diisocyanate, to obtain the products of this invention, is to add enough glycol to the polyester so that the mixture has an average hydroxyl number molecular weight of about 450 to 600 and more preferably from 500 to 550. It will be apparent that the higher the molecular weight of the polyester the more glycol that will be required to obtain the desired hydroxyl content in the mixture of free glycol and polyester. Such mixtures should have a hydroxyl number from about 185 to 250 and more preferably from 200 to 225. To this mixture there is then added an equivalent amount of a diphenyl diisocyanate which will be between about 1.1 and 3.1 mols of diphenyl diisocyanate and more preferably between 1.6 and 2.1 mols of diphenyl diisocyanate. Ratios of the three reactants employed to obtain the products of this invention may vary from 1.1 mols of diphenyl diisocyanate, 1.0 mol of polyester and 0.10 mol of free glycol to 3.1 mols of diphenyl diisocyanate, 1.0 mol of polyester and 2.1 mols of free glycol. The amount of diphenyl diisocyanate in each case depends upon the hydroxyl number molecular weight of the polyester and glycol mixture. More preferred are molar ratios of 1.0 mol of polyester and from 1.6 mols of diphenyl diisocyanate and about 0.6 mol of free glycol to 2.1 mols of diphenyl diisocyanate and about 1.1 mols of free glycol. When employing polytetramethylene adipate of molecular weight of 850, the preferred ratio for an elastomer product having optimum physical properties employs about 1.70 mols of diphenyl methane-p,p'-diisocyanate, 1.0 mol of poly(tetramethylene adipate) and about 0.70 mol of butanediol-1,4. When polytetramethylene adipate of molecular weight 1010 is used the preferred ratio is 2.06/1.00/1.06.

As is apparent from the above recited ratios of reactants for preparing the unique elastomers of this invention, a product is obtained in which there is essentially no free or unreacted diisocyanate or glycol. This is an essential feature of this invention, particularly as to free diisocyanate. An excess of diisocyanate greater than that required to react with the polyester and glycol would result in branched or cross-linked polymers which have poor extrusion properties and are not soluble in solvents. For example, a ratio of reactants of about 1.75 mols of diphenyl diisocyanate, 1 mol of polyester of 850 molecular weight and 0.7 mol of butanediol results in a product which has poorer processing properties and is not readily soluble in the solvents for such materials. Of course, a very small amount of unreacted isocyanate groups may be tolerated but it is desirable that they are essentially reacted. Likewise, excess free unreacted glycol results in products which are not as tough, and which tend to be waxy and have lower molecular weights. A product from reactant ratios of 1.70 mols diphenyl diisocyanate, 1.0 mol of polyester of 850 molecular weight and 0.75 mol of free glycol has undesirable properties when compared to the products made from the critical ratio of reactants of this invention. An excess of either free glycol or diisocyanate above that required for substantially complete utilization of the reactants is undesirable. Preferably, the molar amount of polyester and glycol combined is substantially equivalent to the molar amount of diphenyl diisocyanate.

A preferred embodiment of the invention is now described in detail. A mixture of 1447 grams (1.704 mols) of hydroxyl poly(tetramethylene adipate), molecular weight 849, hydroxyl number 130.4, acid number 0.89, and 109.6 grams (1.218 mols) of butanediol-1,4 is melted in a four liter kettle and stirred with a spiral ribbon stirrer for about 20 minutes at a pressure of 5 to 6 mm. at 100 to 110° C. To this mixture there is then added 730 grams (2.92 mols) of diphenyl methane-p,p'-diisocyanate. This mixture is stirred for about 1 minute and is then poured into a lubricated one gallon can which can is promptly sealed with a friction top and the can placed in a 140° C. oven for 3.5 hours. At the end of this time the product is cooled and there is obtained a clear snappy elastomer having a Shore A hardness of 85 and which can be milled satisfactorily at 225° F. This material may be extruded at high rates to form elastic extrusions with very smooth surfaces and also may be molded satisfactorily for 5 minutes at 300° F. to give transparent amber flexible, snappy sheets. The product has a tensile strength of about 6000 pounds per square inch, elongation of 650%, 300% modulus of 1050 pounds per square inch, immeasurable weight loss when tested for abrasion resistance in the Taber apparatus with maximum load and the coarsest wheel, and Graves angle tear of 44 pounds per 0.1 inch. This strong elastic material has every outward appearance of cross-linked vulcanized diisocyanate-linked elastomers including high tensile strengths and elongations and unexpectedly has abrasion resistance for an elastomer. Further, when this elastomer is extended, it recovers quickly when the stress is released. This is in contrast to some leathery polyurethanes which have high tensile strength but poor elongation and which cold draw when extended. The material is different from vulcanized cross-linked diisocyanate-linked elastomers in that it is substantially free of cross-links. The product is thermoplastic, may be extruded and molded, and may be melted to flow at high temperatures. Also it may be dissolved in solvents to form a solution free of gel. These solvents include ketones such as cyclohexanone, tetramethyl urea, dimethyl formamide and the like. This latter property is of extreme commercial and practical importance in that one is able to prepare cements which, when dried, yield tough, elastic films which are otherwise obtained only through a costly, time consuming and critical process involving water curing of films of a diisocyanate-linked elastomer which contains excess diisocyanate.

As has been stated above, the materials and ratios necessary to obtain novel and unique elastomers of this invention are quite critical. For example, when the above example is repeated with paraphenylene diisocyanates, hard, opaque products are obtained. When the above example is repeated with tolylene diisocyanate a soft rubbery material is obtained which has poor tensile strength and abrasion resistance. When a poly(ethylene adipate) is employed rather than poly(tetramethylene adipate), a softer more rubbery material of poorer physical properties and abrasion resistance is obtained. Further, when the ratio of diisocyanate to free glycol is varied to the extent that free diisocyanate or glycol are present after the reaction, materials quite different from those of this invention are obtained. As has been stated the molecular weight of the polyester is critical and when the above example is repeated with a hydroxyl poly(tetramethylene adipate) of a molecular weight of about 1400 or 1500, a softer rubbery material of poorer physical properties is obtained. Conversely, when a hydroxyl poly(tetramethylene adipate) of a molecular weight of about 600 or less is employed a weak, poorly elastic product is obtained.

When the above embodiment is repeated with hexanediol-1,6 employed in place of butanediol-1,4 as the free glycol, an excellent product having good stress-strain properties, outstanding abrasion resistance and improved permanent set characteristics is obtained. Excellent elastomers are also obtained from other diphenyl diisocyanates and other polyesters such as pentamethylene adipate, tetramethylene pimelate and the like of the critical molecular weight of about 600 to 1200 in the hereinbefore set forth reaction ratios.

In another embodiment of the invention, a mixture of 2323 grams (2.3 mols) of hydroxyl poly(tetramethylene adipate), molecular weight 1010, hydroxyl number 106.1, and 219.52 grams (2.439 mols) of butanediol-1,4 is melted in a heated autoclave and stirred for 15 minutes at 10 mm. pressure at 100 to 105° C. 1178.7 grams (4.715 mols) of diphenyl methane-p,p'-diisocyanate is added to this mixture. The mixture is stirred for 2 minutes and then poured into polytetrafluoroethylene lined metal trays and placed in a 140° C. oven for 3 hours. At the end of this time the product is cooled and there is obtained a clear, snappy elastomer having a Shore A hardness of 85. This elastomer can be milled satisfactorily at a 270 to 280° F. roll temperature on a rubber mill. This product is soluble in dimethyl formamide. The elastomer has a tensile strength of greater than 6,000 pounds per square inch, an elongation of about 600% and 300% modulus of 1300 pounds per square inch. In an abrasion test this non-cross-linked elastomer is 2.6 times better than a vulcanized natural rubber tread stock.

It is apparent from the above examples that the present invention resides in a novel and unique combination of reactants of critical and necessary properties and reacting ratios whereby one obtains a particular diisocyanate-linked elastomer (polyesterurethane) having the appearance and certain desirable physical properties of vulcanizates of diisocyanate-linked elastomers, which at the same time is essentially free of cross-links and is thus readily processable and applied in many applications where cross-linked vulcanizates of diisocyanate-linked elastomers are not usable. The products of this invention are extremely useful in forming molded, extruded and similar articles which are in a form to use after forming without the necessity of a vulcanizing step to obtain the properties of a vulcanized material. Useful solutions or cements which deposit tough films without other treatment than removal of solvent are also made available to the art.

This application is a continuation-in-part of my co-pending application, Serial No. 485,607, filed February 1, 1955, since abandoned.

I claim:

1. A tough, essentially linear polyesterurethane elastomer characterized by being thermoplastic, extrudable, moldable, molten at elevated temperatures, substantially free of cross-links and substantially soluble in dimethyl formamide comprising the reaction product obtained by heating a mixture comprising as essential polyesterurethane forming ingredients (1) one mol of an essentially linear hydroxyl terminated polyester of a saturated, aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus in the presence of (3) from about 0.1 to 2.1 mols of a saturated, aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product.

2. A tough, essentially linear polyesterurethane elastomer characterized by being thermoplastic, extrudable, moldable, molten at elevated temperatures, substantially free of cross-links and substantially soluble in dimethyl formamide comprising the reaction product obtained by heating a mixture comprising as essential polyesterurethane forming ingredients (1) one mol of an essentially linear hydroxyl terminated polyester of a glycol of the formula $HO(CH_2)_xOH$ wherein $x$ is a number from 4 to 8 and a material selected from the group consisting of a dibasic aliphatic acid having the formula $$HOOC(CH_2)_xCOOH$$

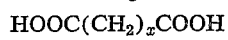

wherein $x$ is a number from 2 to 8 and its anhydride, said polyester having an average molecular weight of from about 700 to 1100, having an acid number less than 5 and containing (2) from about 0.1 to 2.1 mols of a free glycol of the formula $HO(CH_2)_xOH$ wherein $x$ is a number from 4 to 8, said polyester and said free glycol together having a hydroxyl number of from about 185 to 250, and (3) from about 1.1 to 3.1 mols of a diphenyl diisocyanate having an isocyanate group on each phenyl nucleus, the molar amount of said polyester and said free glycol combined being essentially equivalent to the molar amount of said diphenyl diisocyanate whereby there are essentially no unreacted groups of the class consisting of isocyanate and hydroxyl groups in said reaction product.

3. A tough, essentially linear polyesterurethane elastomer characterized by being thermoplastic, extrudable, moldable, molten at elevated temperatures, substantially free of cross-links and substantially soluble in dimethyl formamide comprising the reaction product obtained by heating a mixture comprising as essential polyesterurethane forming ingredients (1) one mol of an essentially linear hydroxyl terminated polyester of a predominant amount of a glycol of the formula $HO(CH_2)_xOH$ where $x$ is a number from 4 to 8 and a minor amount of a material selected from the group consisting of a dibasic aliphatic acid having the formula $HOOC(CH_2)_xCOOH$ wherein $x$ is a number from 2 to 8 and its anhydride, said polyester having an average molecular weight of from 800 to 1050, having an acid number less than about 3 and containing (2) from about 0.6 to 1.1 mols of a free glycol of the formula $HO(CH_2)_xOH$ where $x$ is a number from 4 to 8, said polyester and said free glycol together having a hydroxyl number of from 200 to 225 and (3) from 1.6 to 2.1 mols of a diphenyl diisocyanate having an isocyanate group on each phenyl nucleus, the molar amount of said polyester and said free glycol combined being essentially equivalent to the molar amount of said diphenyl diisocyanate whereby there are essentially no unreacted groups of the class consisting of isocyanate and hydroxyl groups in said reaction product.

4. The method for preparing a tough, essentially linear polyesterurethane elastomer characterized by being thermoplastic, extrudable, moldable, molten at elevated temperatures, substantially soluble in dimethyl formamide and substantially free of cross-links which comprises reacting together, as essential polyesterurethane forming ingredients, (1) one mol of an essentially linear hydroxyl terminated polyester of a saturated, aliphatic glycol containing from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10 mixed with (2) from about 1.1 to 3.1 mols of a diphenyl diisocyanate having an isocyanate group on each phenyl nucleus, in the presence of (3) from about 0.1 to 2.1 mols of a saturated, aliphatic free glycol containing from 4 to 10 carbon atoms and having hydroxyl groups on its terminal carbon atoms, the molar amount of said diphenyl diisocyanate being adjusted so as to be essentially equivalent to the molar amount of said polyester and said free glycol so that the resulting elastomer contains essentially no unreacted groups of the class consisting of isocyanate and hydroxyl groups, and heating the resulting mixture to thereby obtain said elastomer.

5. The method for preparing a tough, essentially linear polyesterurethane elastomer characterized by being thermoplastic, extrudable, moldable, molten at elevated temperatures, substantially soluble in dimethyl formamide and substantially free of cross-links which comprises reacting together, as essential polyesterurethane forming ingredients, (1) one mol of an essentially linear hydroxyl terminated polyester of a glycol having the formula $HO(CH_2)_xOH$ where $x$ is a number from 4 to 8 and a material selected from the group consisting of a dibasic aliphatic acid of the formula $HOOC(CH_2)_xCOOH$ where $x$ is a number from 2 to 8 and its anhydride, said polyester having an average molecular weight of from about 700 to 1100, having an acid number less than 5 and containing (2) from about 0.1 to 2.1 mols of a free glycol of the formula $HO(CH_2)_xOH$ where $x$ is a number from 4 to 8, said polyester and said free glycol together having a hydroxyl number of from about 185 to 250, mixed with (3) from about 1.1 to 3.1 mols of a diphenyl diisocyanate having an isocyanate group on each phenyl nucleus, the molar amount of said diphenyl diisocyanate being adjusted so as to be essentially equivalent to the molar amount of said polyester and said free glycol so that the resulting elastomer contains essentially no unreacted groups of the class consisting of isocyanate and hydroxyl groups, and heating the resulting mixture to thereby obtain said elastomer.

6. The method for preparing a tough, essentially linear polyesterurethane elastomer characterized by being thermoplastic, extrudable, moldable, molten at elevated temperatures, substantially soluble in dimethyl formamide and substantially free of cross-links which comprises reacting together, as essential polyesterurethane forming ingredients, (1) one mol of an essentially linear hydroxyl terminated polyester of a predominant amount of a glycol having the formula $HO(CH_2)_xOH$ where $x$ is a number from 4 to 8 and a minor amount of a material selected from the group consisting of a dibasic aliphatic acid having the formula $HOOC(CH_2)_xCOOH$ where $x$ is a number from 2 to 8 and its anhydride, said polyester having an average molecular weight of from 800 to 1050, having an acid number less than about 3 and containing (2) from about 0.6 to 1.1 mols of a free glycol having the formula $HO(CH_2)_xOH$ where $x$ is a number from 4 to 8, said polyester and said free glycol together having a hydroxyl number of from 200 to 225, mixed with (3) from 1.6 to 2.1 mols of a diphenyl diisocyanate having an isocyanate group on each phenyl nucleus, the molar amount of said diphenyl diisocyanate being adjusted so as to be essentially equivalent to the molar amount of said polyester and said free glycol so that the resulting elastomer contains essentially no unreacted groups of the class consisting of isocyanate and hydroxyl groups, and heating the resulting mixture to thereby obtain said elastomer.

7. A tough essentially linear polyesterurethane elastomer substantially free of cross-links and substantially soluble in dimethyl formamide comprising the reaction product obtained by heating a mixture comprising, as essential polyesterurethane forming ingredients, (1) one mol of an essentially hydroxyl terminated poly(tetramethylene adipate) having a molecular weight of from about 700 to 1100 and an acid number of less than 5 and containing (2) from about 0.6 to about 1.1 mols of a free glycol of the formula $HO(CH_2)_xOH$ wherein $x$ is a number from 4 to 8, said polyester and said free glycol having a combined hydroxyl number of between about 200 and 240, and (3) from 1.6 to 2.1 mols of a diphenyl diisocyanate having an isocyanate group on each phenyl nucleus, the molar amount of said polyester and said free glycol combined being essentially equivalent to the molar amount of said diisocyanate whereby there are essentially no unreacted groups of the class consisting of isocyanate and hydroxyl groups in said reaction product.

8. A tough essentially linear polyesterurethane elastomer substantially free of cross-links and substantially soluble in dimethyl formamide comprising the reaction product obtained by heating a mixture comprising, as essential polyesterurethane forming ingredients, (1) one mol of an essentially hydroxyl terminated poly(tetramethylene adipate) of a molecular weight of about 850, having an acid number less than about 3 and containing (2) about 0.7 mol of free butanediol-1,4, and (3) about 1.70 mols of diphenyl methane-p,p'-diisocyanate, said reaction product containing essentially no unreacted groups of the class consisting of isocyanate and hydroxyl groups.

9. A tough essentially linear polyesterurethane elastomer substantially free of cross-links and substantially soluble in dimethyl formamide comprising the reaction product obtained by heating a mixture, comprising as essential polyesterurethane forming ingredients, (1) one mol of an essentially hydroxyl terminated poly(tetramethylene adipate) of a molecular weight of about 1000, having an acid number less than about 3 and containing (2) about 1.06 mols of free butanediol-1,4, and (3) about 2.06 mols of diphenyl methane-p,p'-diisocyanate, said reaction product containing essentially no unreacted groups of the class consisting of isocyanate and hydroxyl groups.

10. A tough essentially linear polyesterurethane elastomer substantially free of cross-links and substantially soluble in dimethyl formamide comprising the reaction product obtained by heating a mixture comprising, as essential polyesterurethane forming ingredients, (1) one mol of an essentially hydroxyl terminated poly(tetramethylene adipate) having a molecular weight of from about 700 to 1100 and an acid number less than 5, (2) from about 0.6 to about 1.1 mols of free butanediol-1,4, said polyester and said free glycol combined having a hydroxyl number of between about 200 and 225, and (3) from 1.6 to 2.1 mols of a diphenyl methane-p,p'-diisocyanate, the molar amount of said diisocyanate being essentially equivalent to the combined molar amount of said polyester and said free glycol whereby there are essentially no unreacted groups of the class consisting of isocyanate and hydroxyl groups in said reaction product.

11. A composition of matter comprising the reaction product obtained by heating a mixture, comprising as essential polyesterurethane forming ingredients, (1) one mol of an essentially linear hydroxyl terminated polyester of a glycol of the formula $HO(CH_2)_xOH$ wherein $x$ is a number from 4 to 8 and a material selected from the group consisting of a dibasic aliphatic acid having the formlula $HOOC(CH_2)_xCOOH$ wherein $x$ is a number from 2 to 8 and its anhydride, said polyester having an average molecular weight of from about 700 to 1100 and having an acid number less than 5, (2) from about 0.1 to 2.1 mols of a free glycol of the formula $HO(CH_2)_xOH$ wherein $x$ is a number from 4 to 8, said polyester and said free glycol together having a hydroxyl number of from about 185 to 250 and having an average hydroxyl number molecular weight of from about 450 to 600, and (3) from about 1.1 to 3.1 mols of a diphenyl diisocyanate having an isocyanate group on each phenyl nucleus, the molar amount of said polyester and said free glycol combined being essentially equivalent to the molar amount of said diisocyanate whereby there are essentially no unreacted groups of the class consisting of isocyanate and hydroxyl groups in said reaction product.

12. The method which comprises reacting together, as essential polyesterurethane forming ingredients, (1) one mol of an essentially linear hydroxyl terminated polyester of a glycol having the formula $HO(CH_2)_xOH$ where $x$ is a number from 4 to 8 and a material selected from the group consisting of a dibasic aliphatic acid of the formula $HOOC(CH_2)_xCOOH$ where $x$ is a number from 2 to 8 and its anhydride, said polyester having an average molecular weight of from about 700 to 1100 and having an acid number less than 5, (2) from about 0.1 to 2.1 mols of a free glycol of the formula $HO(CH_2)_xOH$ where $x$ is a number from 4 to 8, said polyester and said free glycol together having a hydroxyl number of from about 185 to 250 and having an average hydroxyl number molecular weight of from about 450 to 600, and (3) from about 1.1 to 3.1 mols of a diphenyl diisocyanate having an isocyanate group on each phenyl nucleus, the molar amount of said diisocyanate being adjusted so as to be essentially equivalent to the molar amount of said polyester and said free glycol so that the resulting polyesterurethane contains essentially no unreacted groups of the class consisting of isocyanate and hydroxyl groups, and heating said reactants to thereby obtain said polyesterurethane.

13. The tough essentially linear polyesterurethane elastomer of claim 7 wherein the glycol is butanediol-1,4.

14. The tough essentially linear polyesterurethane elastomer of claim 7 wherein the diphenyl diisocyanate is diphenyl methane-p,p'-diisocyanate.

References Cited in the file of this patent

UNITED STATES PATENTS

| | | |
|---|---|---|
| 2,621,166 | Schmidt et al. | Dec. 9, 1952 |
| 2,729,618 | Muller et al. | Jan. 3, 1956 |
| 2,741,800 | Brockway | Apr. 17, 1956 |
| 2,755,266 | Brenschede | July 17, 1956 |

FOREIGN PATENTS

| | | |
|---|---|---|
| 516,512 | Belgium | Jan. 15, 1953 |
| 700,608 | Great Britain | Dec. 9, 1953 |